United States Patent
Haba et al.

(10) Patent No.: US 9,441,515 B2
(45) Date of Patent: Sep. 13, 2016

(54) EXHAUST PURIFICATION SYSTEM OF INTERNAL COMBUSTION ENGINE

(71) Applicants: Yuki Haba, Mishima (JP); Kohei Yoshida, Gotenba (JP)

(72) Inventors: Yuki Haba, Mishima (JP); Kohei Yoshida, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/114,587

(22) PCT Filed: Feb. 5, 2013

(86) PCT No.: PCT/JP2013/052608
§ 371 (c)(1),
(2) Date: Oct. 29, 2013

(87) PCT Pub. No.: WO2014/122728
PCT Pub. Date: Aug. 14, 2014

(65) Prior Publication Data
US 2015/0322834 A1   Nov. 12, 2015

(51) Int. Cl.
 *F01N 3/00* (2006.01)
 *F01N 3/08* (2006.01)
 *B01D 53/94* (2006.01)
 (Continued)

(52) U.S. Cl.
CPC ......... *F01N 3/0814* (2013.01); *B01D 53/9431* (2013.01); *B01D 53/9495* (2013.01); *F01N 3/0842* (2013.01); *F01N 3/0871* (2013.01); *F01N 3/2033* (2013.01);
(Continued)

(58) Field of Classification Search
CPC .. F01N 3/0842; F01N 13/02; F02D 41/0275; F02D 41/1411; F02D 41/0295
USPC .................. 60/273, 274, 285, 286, 295, 301
See application file for complete search history.

(56) References Cited

U.S. PATENT DOCUMENTS 6,233,925 B1 * 5/2001 Hirota .................. F01N 3/0233
                                                                 60/285
6,267,937 B1 * 7/2001 Ma ..................... B01D 53/9454
                                                                 423/213.2

(Continued)

FOREIGN PATENT DOCUMENTS

WO    WO 2011/114501 A1    9/2011
WO    WO 2012/053117 A1    4/2012

*Primary Examiner* — Patrick Maines
(74) *Attorney, Agent, or Firm* — Oliff PLC

(57) ABSTRACT

A hydrocarbon feed valve and an exhaust purification catalyst are arranged in an engine exhaust passage. A first $NO_X$ purification method which injects hydrocarbons from the hydrocarbon feed valve by a predetermined period to thereby remove $NO_X$ which is contained in the exhaust gas and a second $NO_X$ purification method which makes the air-fuel ratio of the exhaust gas which flows into the exhaust purification catalyst rich to make the exhaust purification catalyst release the stored $NO_X$ when the $NO_X$ which is stored in the exhaust purification catalyst exceeds a first allowable value are selectively used. Hydrocarbons are injected from the hydrocarbon feed valve by the predetermined period, and when the $NO_X$ which is stored in the exhaust purification catalyst exceeds a second allowable value which is smaller than the first allowable value, the air-fuel ratio of the exhaust gas which flows into the exhaust purification catalyst is made rich.

7 Claims, 16 Drawing Sheets

(51) Int. Cl.
 *F02D 41/02* (2006.01)
 *F02D 41/14* (2006.01)
 *F01N 3/20* (2006.01)

(52) U.S. Cl.
 CPC ..... *F02D 41/0275* (2013.01); *F02D 41/1446* (2013.01); *F02D 41/1475* (2013.01); *B01D 2251/208* (2013.01); *B01D 2257/404* (2013.01); *B01D 2258/012* (2013.01); *F01N 2900/1602* (2013.01); *F01N 2900/1614* (2013.01); *Y02T 10/26* (2013.01)

(56) References Cited

U.S. PATENT DOCUMENTS

| | | | |
|---|---|---|---|
| 6,823,843 B1* | 11/2004 | Goralski, Jr. | F02D 41/0275 123/435 |
| 6,932,069 B2* | 8/2005 | Suyama | F01N 3/0871 123/285 |
| 2004/0025499 A1* | 2/2004 | Nakatani | B01D 53/9431 60/286 |
| 2004/0107694 A1* | 6/2004 | Yoshida | B01D 53/9495 60/274 |
| 2005/0222748 A1* | 10/2005 | Naik | F02D 41/0275 701/103 |
| 2006/0070373 A1* | 4/2006 | Huang | F01N 3/023 60/286 |
| 2007/0220865 A1* | 9/2007 | Cunningham | F01N 3/0253 60/286 |
| 2009/0049826 A1* | 2/2009 | Toshioka | F01N 3/0842 60/286 |
| 2012/0124971 A1 | 5/2012 | Bisaiji et al. | |
| 2013/0195724 A1 | 8/2013 | Bisaiji et al. | |
| 2015/0176458 A1* | 6/2015 | Park | F01N 3/208 60/605.2 |
| 2015/0204261 A1* | 7/2015 | Sakurai | F02D 41/1475 60/285 |

\* cited by examiner

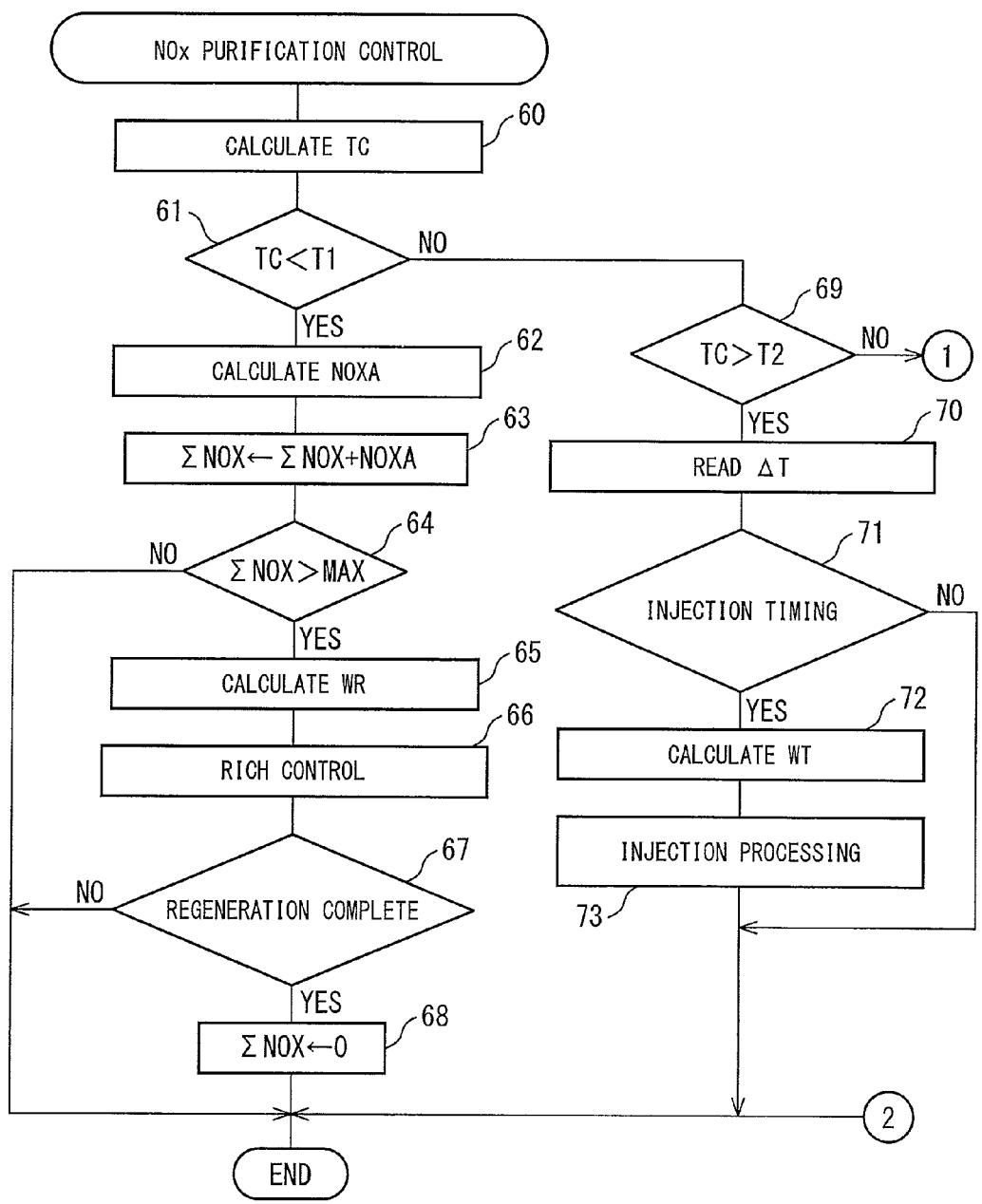

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine in which an exhaust purification catalyst is arranged in an engine exhaust passage and a hydrocarbon feed valve is arranged upstream of the exhaust purification catalyst in the engine exhaust passage, the exhaust purification catalyst has the property of reducing the $NO_X$ which is contained in exhaust gas if making a concentration of hydrocarbons which flow into the exhaust purification catalyst vibrate by within a predetermined range of amplitude and by within a predetermined range of period and has the property of being increased in storage amount of $NO_X$ which is contained in the exhaust gas if making the vibration period of the hydrocarbon concentration longer than the predetermined range, a first $NO_X$ removal method which injects hydrocarbons from the hydrocarbon feed valve by a predetermined injection period to thereby remove the $NO_X$ which is contained in the exhaust gas and a second $NO_X$ removal method which makes the air-fuel ratio of the exhaust gas which flows into the exhaust purification catalyst rich to make the exhaust purification catalyst release the stored $NO_X$ when the $NO_X$ which is stored in the exhaust purification catalyst exceeds the allowable value are selectively used, and in the second $NO_X$ removal method, the period by which the air-fuel ratio of the exhaust gas which flows into the exhaust purification catalyst is made rich is longer than the above-mentioned predetermined injection period (for example, see Patent Literature 1).

In this internal combustion engine, when the temperature of the exhaust purification catalyst is high, the $NO_X$ removal action by the first $NO_X$ removal method is performed, while when the temperature of the exhaust purification catalyst is low, the $NO_X$ removal action by the second $NO_X$ removal method is performed. In this regard, in this internal combustion engine, when the $NO_X$ removal action by the first $NO_X$ removal method is being performed, the exhaust purification catalyst stores $NO_X$. If the amount of $NO_X$ which is stored in this exhaust purification catalyst increases, the $NO_X$ removal rate at the time when the $NO_X$ removal action by the first $NO_X$ removal method is being performed ends up falling. Therefore, in this internal combustion engine, when the $NO_X$ removal action by the first $NO_X$ removal method is being performed, when the $NO_X$ which is stored in the exhaust purification catalyst increases, the amount of injection of hydrocarbons from the hydrocarbon feed valve is increased to make the air-fuel ratio of the exhaust gas which flows into the exhaust purification catalyst rich and thereby make the exhaust purification catalyst release the stored $NO_X$.

CITATIONS LIST

Patent Literature

Patent Literature 1: WO2012/053117 A1

SUMMARY OF INVENTION

Technical Problem

However, in this internal combustion engine, in the case where the $NO_X$ removal action by the first $NO_X$ removal method is being performed, only restoration of the $NO_X$ removal rate when the $NO_X$ removal rate falls is considered. Further improvement of the $NO_X$ purification rate when the $NO_X$ removal action by the first $NO_X$ removal method is being performed is not considered at all. An object of the present invention is to provide an exhaust purification system of an internal combustion engine which is designed so that a higher $NO_X$ purification rate is obtained compared to when the $NO_X$ removal action by the first $NO_X$ removal method is being performed and when the $NO_X$ removal action by the second $NO_X$ removal method is being performed.

Solution to Problem

According to the present invention, there is provided an exhaust purification system of an internal combustion engine in which an exhaust purification catalyst is arranged in an engine exhaust passage and a hydrocarbon feed valve is arranged in the engine exhaust passage upstream of the exhaust purification catalyst, a precious metal catalyst is carried on an exhaust gas flow surface of the exhaust purification catalyst and a basic exhaust gas flow surface part is formed around the precious metal catalyst, the exhaust purification catalyst has a property of reducing $NO_X$ which is contained in exhaust gas if making a concentration of hydrocarbons which flow into the exhaust purification catalyst vibrate by within a predetermined range of amplitude and by within a predetermined range of period and has a property of being increased in storage amount of $NO_X$ which is contained in the exhaust gas if making the vibration period of the hydrocarbon concentration longer than the predetermined range, a first $NO_X$ removal method which injects hydrocarbons from the hydrocarbon feed valve by a predetermined injection period to thereby remove the $NO_X$ which is contained in the exhaust gas and a second $NO_X$ removal method which makes an air-fuel ratio of the exhaust gas which flows into the exhaust purification catalyst rich to make the exhaust purification catalyst release a stored $NO_X$ when the $NO_X$ which is stored in the exhaust purification catalyst exceeds a first allowable value are selectively used, and in the second $NO_X$ removal method, the period by which the air-fuel ratio of the exhaust gas which flows into the exhaust purification catalyst is made rich is longer than the above-mentioned predetermined injection period, wherein temperature regions which the exhaust purification catalyst can take at the time of engine operation are divided into three regions of a low temperature region, an intermediate temperature region, and a high temperature region, in the high temperature region, an $NO_X$ removal action by the first $NO_X$ removal method is performed, in the low temperature region, an $NO_X$ removal action by the second $NO_X$ removal method is performed, and in the intermediate temperature region, hydrocarbons are injected from the hydrocarbon feed valve by the predetermined injection period and, when the $NO_X$ which is stored in the exhaust purification catalyst exceeds a predetermined second allowable value of a value smaller than the first allowable value, the air-fuel ratio of the exhaust gas which flows into the exhaust purification catalyst is made rich.

Advantageous Effects of Invention

In the intermediate temperature region of the exhaust purification catalyst, it is possible to obtain a higher $NO_X$ purification rate than when the $NO_X$ removal action by the first $NO_X$ removal method is being performed and than when the $NO_X$ removal action by the second $NO_X$ removal method is being performed.

BRIEF DESCRIPTION OF DRAWINGS

FIG. 21 is a flow chart for performing an $NO_X$ purification control.

DESCRIPTION OF EMBODIMENTS

Figure 1:
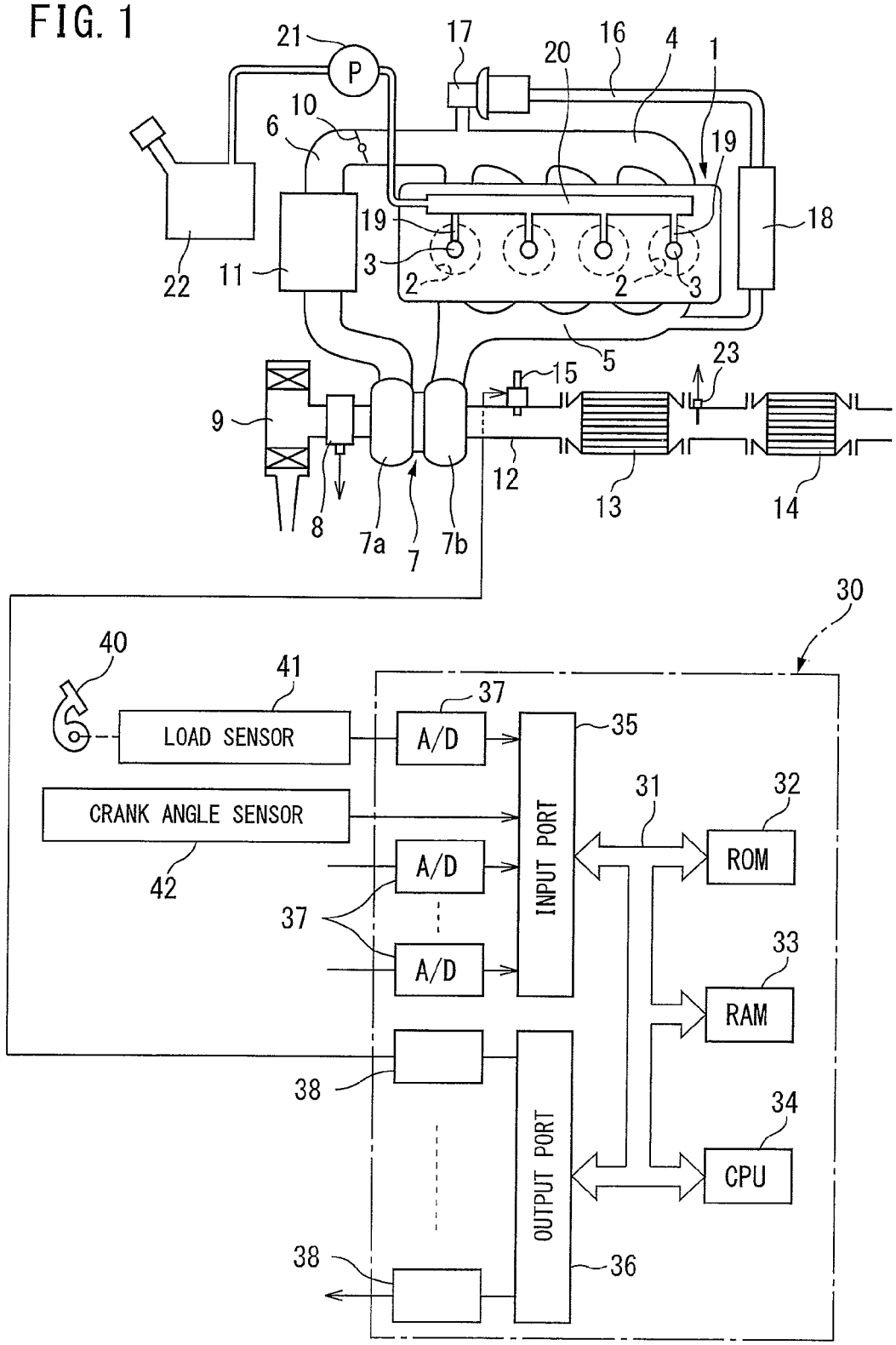
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 which is driven by an actuator is arranged. Around the intake duct 6, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7, and an outlet of the exhaust turbine 7b is connected through an exhaust pipe 12 to an inlet of an exhaust purification catalyst 13. In an embodiment of the present invention, this exhaust purification catalyst 13 is comprised of an $NO_X$ storage catalyst 13. An outlet of the exhaust purification catalyst 13 is connected to an inlet of a particulate filter 14 and, upstream of the exhaust purification catalyst 13 inside the exhaust pipe 12, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling the EGR gas which flows through the inside of the EGR passage 16. In the embodiment which is shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is arranged for detecting the temperature of the exhaust gas flowing out from the exhaust purification catalyst 13, and the output signals of this temperature sensor 23 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21.

Figure 2:
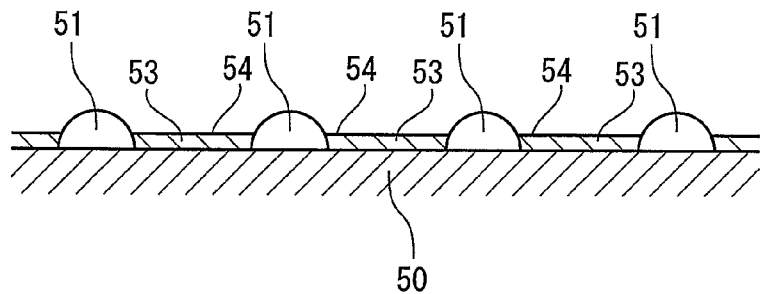
FIG. 2 is a view which schematically shows the surface part of a catalyst carrier.

FIG. 2 schematically shows a surface part of a catalyst carrier which is carried on a substrate of the exhaust purification catalyst 13 shown in FIG. 1. At this exhaust purification catalyst 13, as shown in FIG. 2, for example, there is provided a catalyst carrier 50 made of alumina on which precious metal catalysts 51 comprised of platinum Pt are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. In this case, on the catalyst carrier 50 of the exhaust purification catalyst 13, in addition to platinum Pt, rhodium Rh or palladium Pd may be further carried. Note that the exhaust gas flows along the top of the catalyst carrier 50, so the precious metal catalysts 51 can be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

Figure 3:
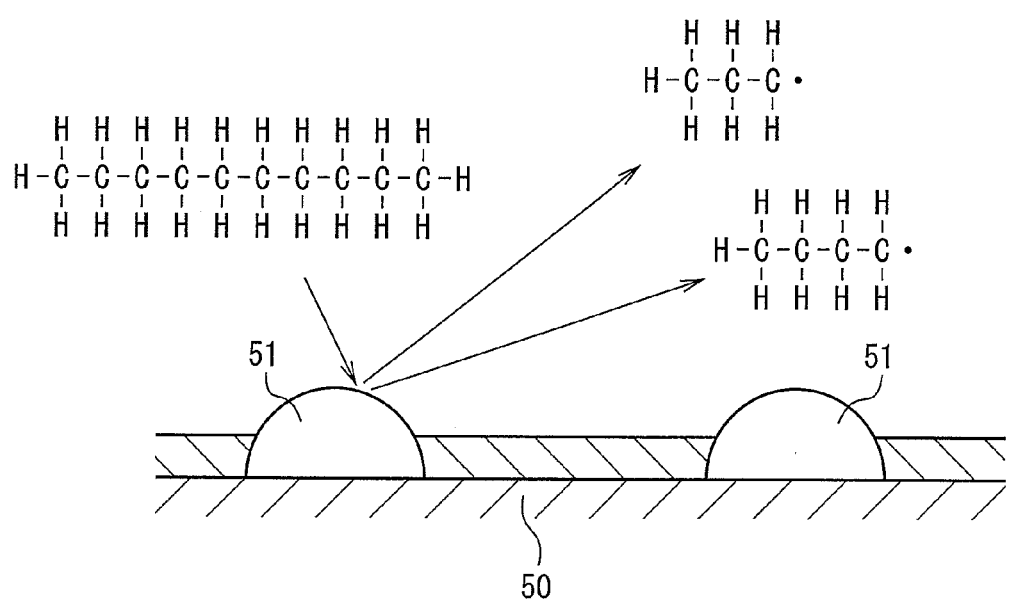
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the precious metal catalyst 51.

Figure 4:
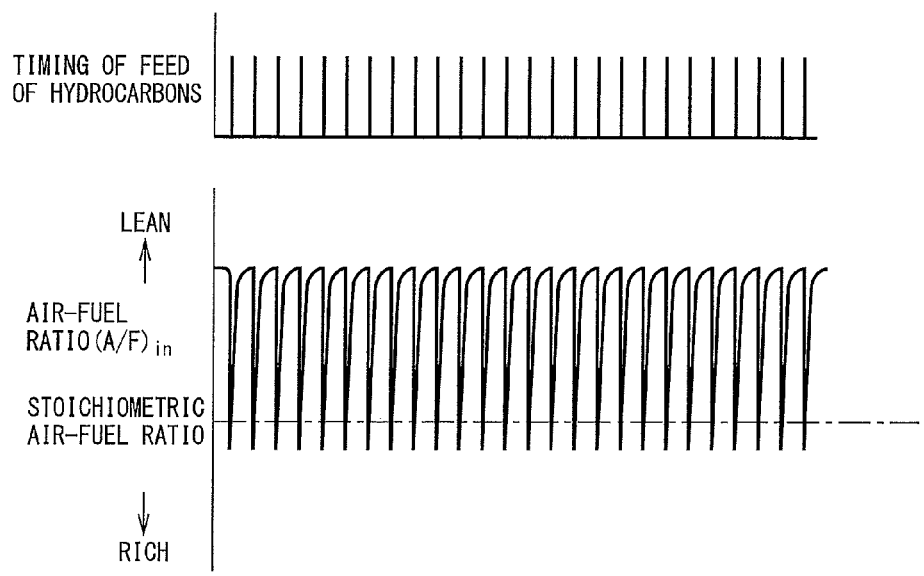
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the change in the air-fuel ratio (A/F) in depends on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
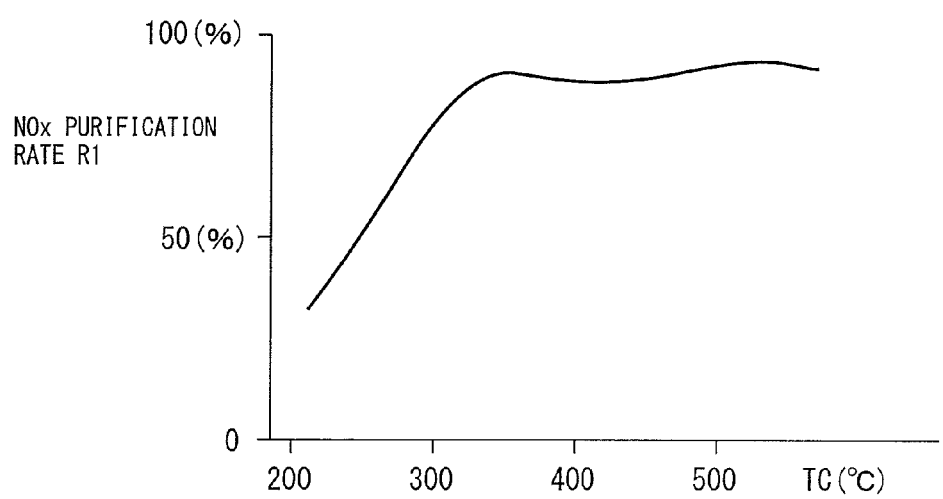
FIG. 5 is a view which shows an $NO_X$ purification rate R1.

FIG. 5 shows the $NO_X$ purification rate R1 by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, periodically make the air-fuel ratio (A/F) in of the exhaust gas flowing to the exhaust purification catalyst 13 rich. In this regard, as a result of a research relating to $NO_X$ purification for a long time, it is learned that if making the concentration of hydrocarbons which flow into the exhaust purification catalyst 13 vibrate by within a predetermined range of amplitude and within a predetermined range of period, as shown in FIG. 5, an extremely high $NO_X$ purification rate R1 is obtained even in a 350° C. or higher high temperature region.

Figure 6A:
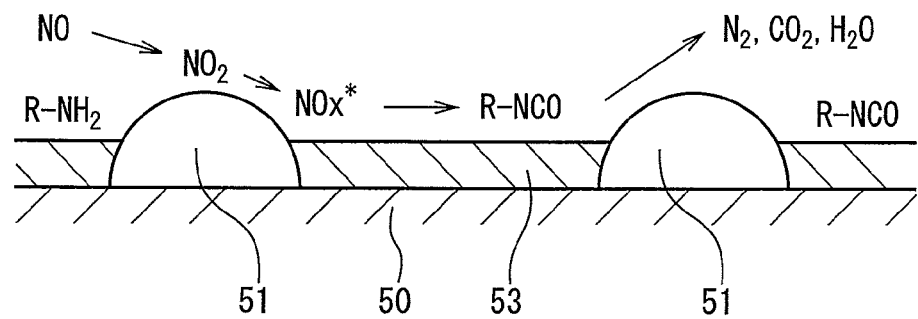
FIGS. 6A and 6B are views for explaining an oxidation reduction reaction in an exhaust purification catalyst.
Figure 6B:
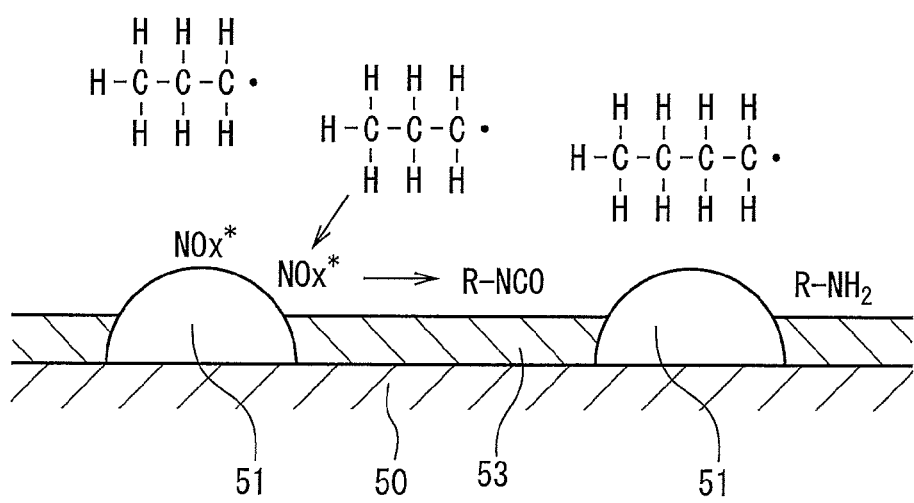

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_X$ purification rate R1. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F) in of the exhaust gas flowing to the exhaust purification catalyst 13 is made rich, that is, the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_X^*$".

On the other hand, if hydrocarbons are fed from the hydrocarbon feed valve 15 and the air-fuel ratio (A/F) in of the exhaust gas flowing to the exhaust purification catalyst 13 is made rich, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the $NO_X$ in the exhaust gas, react with the active $NO_X$*, react with the surrounding oxygen, or break down on their own. Due to this, the reducing intermediates R—NCO and R—$NH_2$ are converted to $N_2$, $CO_2$, and $H_2O$ as shown in FIG. 6A, therefore the $NO_X$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the $NO_X$ in the exhaust gas or the active $NO_X$* or oxygen or break down on their own whereby the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_X$ in the exhaust gas or the active $NO_X$* or oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_X$ in the exhaust gas or the active $NO_X$* or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_X$* is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in the embodiment according to the present invention, to react the $NO_X$ contained in the exhaust gas and the reformed hydrocarbons and produce the reducing intermediates R—NCO and R—$NH_2$ containing nitrogen and hydrocarbons, the precious metal catalysts 51 are carried on the exhaust gas flow surfaces of the exhaust purification catalyst 13. To hold the produced reducing intermediates R—NCO and R—$NH_2$ inside the exhaust purification catalyst 13, the basic exhaust gas flow surface parts 54 are formed around the precious metal catalysts 51. The reducing intermediates R—NCO and R—$NH_2$ which are held on the basic exhaust gas flow surface parts 54 are converted to $N_2$, $CO_2$, and $H_2O$. The vibration period of the hydrocarbon concentration is made the vibration period required for continuation of the production of the reducing intermediates R—NCO and R—$NH_2$. Incidentally, in the example shown in FIG. 4, the injection interval is made 3 seconds.

Figure 7A:
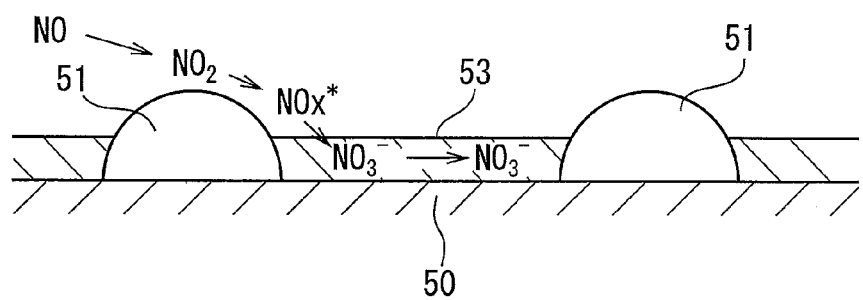
FIGS. 7A and 7B are views for explaining an oxidation reduction reaction in an exhaust purification catalyst.

If the vibration period of the hydrocarbon concentration, that is, the injection period of hydrocarbons from the hydrocarbon feed valve 15, is made longer than the above predetermined range of period, the reducing intermediates R—NCO and R—$NH_2$ disappear from the surface of the basic layer 53. At this time, the active $NO_X$* which is produced on the platinum Pt 53, as shown in FIG. 7A, diffuses in the basic layer 53 in the form of nitrate ions $NO_3^-$ and becomes nitrates. That is, at this time, the $NO_X$ in the exhaust gas is absorbed in the form of nitrates inside of the basic layer 53.

Figure 7B:
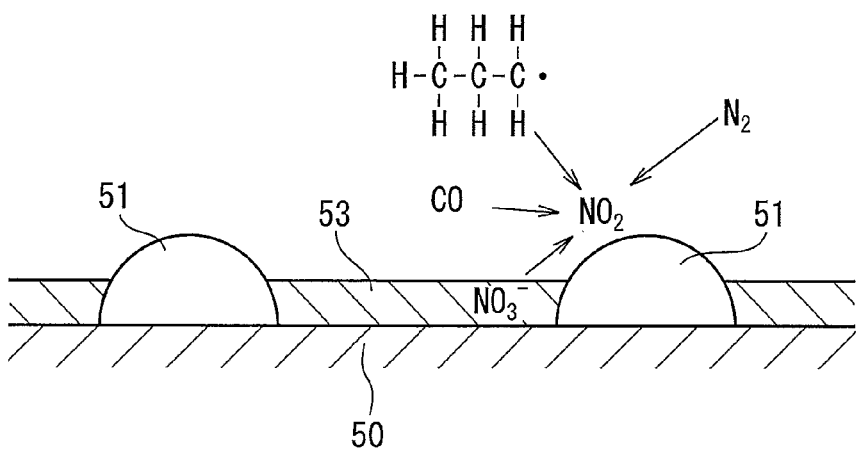

On the other hand, FIG. 7B shows the case where the air-fuel ratio of the exhaust gas which flows into the exhaust purification catalyst 13 is made the stoichiometric air-fuel ratio or rich when the $NO_X$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
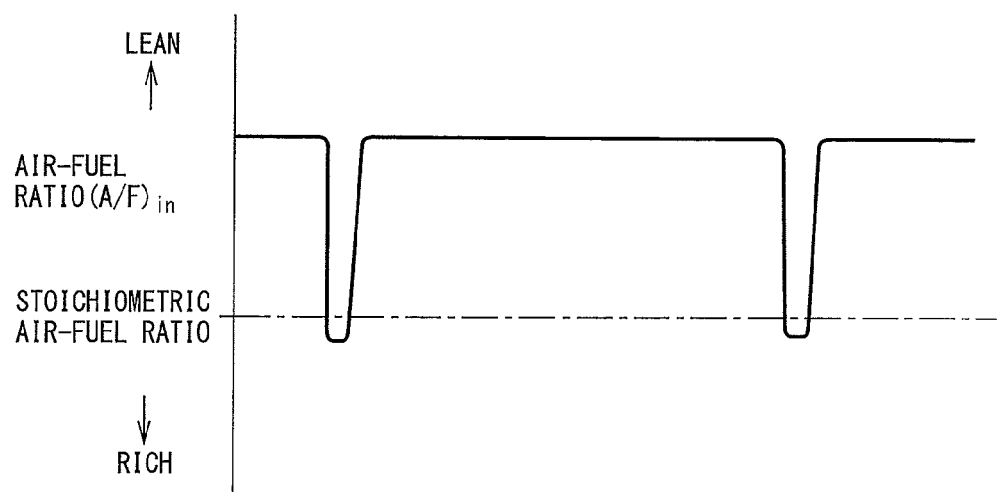
FIG. 8 is a view which shows changes in an air-fuel ratio of exhaust gas which flows into an exhaust purification catalyst.

FIG. 8 shows the case of making the air-fuel ratio (A/F) in of the exhaust gas which flows into the exhaust purification catalyst 13 temporarily rich slightly before the $NO_X$ absorption ability of the basic layer 53 becomes saturated. Note that, in the example shown in FIG. 8, the time interval of this rich control is 1 minute or more. In this case, the $NO_X$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_X$.

Note that, at this time, sometimes the basic layer 53 temporarily adsorbs the $NO_X$. Therefore, if using term of "storage" as a term including both "absorption" and "adsorption", at this time, the basic layer 53 performs the role of an $NO_X$ storage agent for temporarily storing the $NO_X$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_X$ storage catalyst which stores the $NO_X$ when the air-fuel ratio of the exhaust gas is lean and releases the stored $NO_X$ when the oxygen concentration in the exhaust gas falls.

Figure 9:
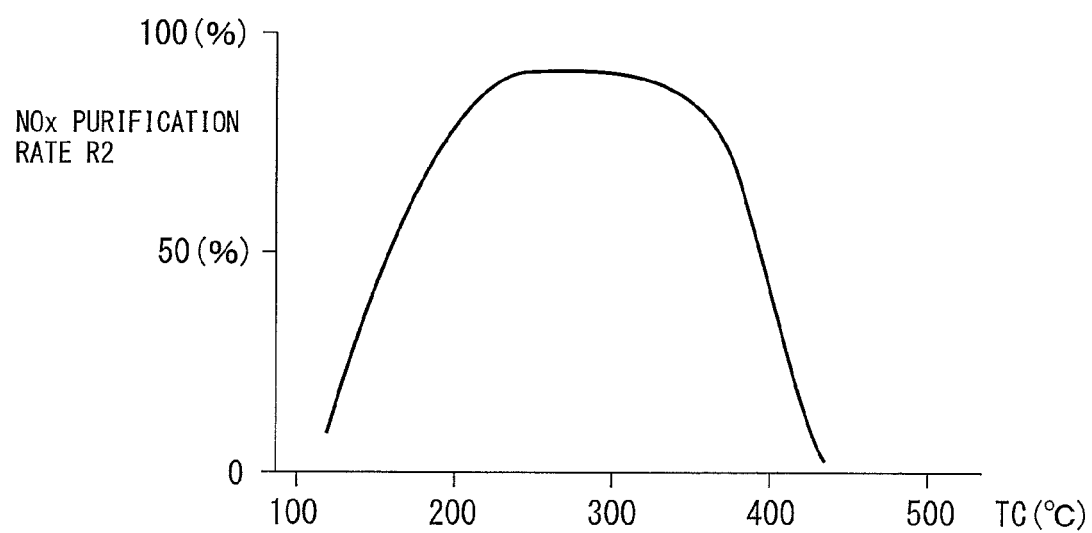
FIG. 9 is a view which shows an $NO_X$ purification rate R2.

FIG. 9 shows the $NO_X$ purification rate R2 when making the exhaust purification catalyst 13 function as an $NO_X$ storage catalyst in this way. Note that, the abscissa of the FIG. 9 shows the catalyst temperature TC of the exhaust purification catalyst 13. When making the exhaust purification catalyst 13 function as an $NO_X$ storage catalyst, as shown in FIG. 9, when the catalyst temperature TC is 250° C. to 300° C., an extremely high $NO_X$ purification rate is obtained, but when the catalyst temperature TC becomes a 350° C. or higher high temperature, the $NO_X$ purification rate R2 falls.

In this way, when the catalyst temperature TC becomes 350° C. or more, the $NO_X$ purification rate R2 falls because if the catalyst temperature TC becomes 350° C. or more, $NO_X$ is less easily stored and the nitrates break down by heat and are released in the form of $NO_2$ from the exhaust purification catalyst 13. That is, so long as storing $NO_X$ in the form of nitrates, when the catalyst temperature TC is high, it is difficult to obtain a high $NO_X$ purification rate R2. However, in the new $NO_X$ purification method shown from FIG. 4 to FIGS. 6A and 6B, nitrates are not formed or even if formed are extremely small in amount, and consequently, as shown in FIG. 5, even when the catalyst temperature TC is high, a high $NO_X$ purification rate R1 is obtained.

In the embodiment according to the present invention, to be able to purify $NO_X$ by using this new $NO_X$ purification method, a hydrocarbon feed valve 15 for feeding hydrocarbons is arranged in the engine exhaust passage, an exhaust purification catalyst 13 is arranged in the engine exhaust passage downstream of the hydrocarbon feed valve 15, precious metal catalysts 51 are carried on the exhaust gas flow surfaces of the exhaust purification catalyst 13, basic exhaust gas flow surface parts 54 are formed around the precious metal catalysts 51, the exhaust purification catalyst 13 has the property of reducing the $NO_X$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_X$ which is contained in exhaust gas if the vibration period of the hydrocarbon concentration is made longer than this predetermined range, and, at the time of engine operation, the hydrocarbons are injected from the hydrocarbon feed valve 15 within the predetermined range of period to thereby reduce the $NO_X$ which is contained in the exhaust gas in the exhaust purification catalyst 13.

That is, the $NO_X$ purification method which is shown from FIG. 4 to FIGS. 6A and 6B can be said to be a new $NO_X$ purification method designed to remove $NO_X$ without forming so much nitrates in the case of using an exhaust purification catalyst which carries precious metal catalysts and forms a basic layer which can absorb $NO_X$. In actuality, when using this new $NO_X$ purification method, the nitrates which are detected from the basic layer 53 become extremely smaller in amount compared with the case where making the exhaust purification catalyst 13 function as an $NO_X$ storage catalyst. Note that, this new $NO_X$ purification method will be referred to below as the "first $NO_X$ purification method".

Figure 10:
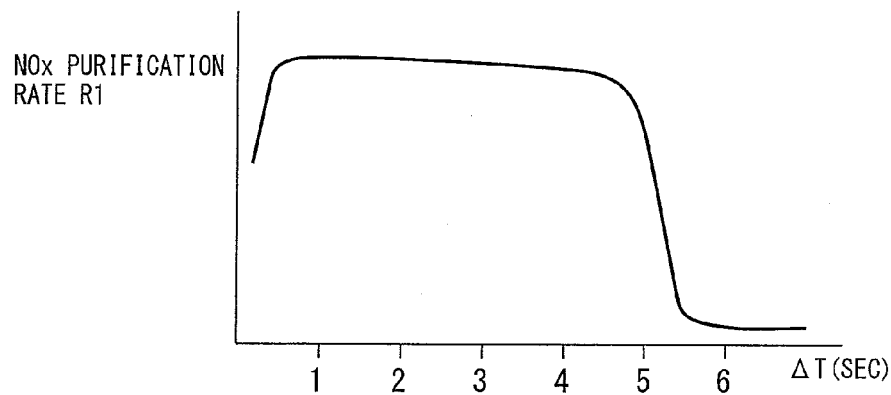
FIG. 10 is a view which shows a relationship between a vibration period $\Delta T$ of hydrocarbon concentration and an $NO_X$ purification rate R1.

Now, as mentioned before, if the injection period ΔT of the hydrocarbons from the hydrocarbon feed valve 15 becomes longer, the time period in which the oxygen concentration around the active $NO_X^*$ becomes higher becomes longer in the time period after the hydrocarbons are injected to when the hydrocarbons are next injected. In this case, in the embodiment shown in FIG. 1, if the injection period ΔT of the hydrocarbons becomes longer than about 5 seconds, the active $NO_X^*$ starts to be absorbed in the form of nitrates inside the basic layer 53. Therefore, as shown in FIG. 10, if the vibration period ΔT of the hydrocarbon concentration becomes longer than about 5 seconds, the $NO_X$ purification rate R1 falls. Therefore, the injection period ΔT of the hydrocarbons has to be made 5 seconds or less.

On the other hand, in the embodiment of the present invention, if the injection period ΔT of the hydrocarbons becomes about 0.3 second or less, the injected hydrocarbons start to build up on the exhaust gas flow surfaces of the exhaust purification catalyst 13, therefore, as shown in FIG. 10, if the injection period ΔT of the hydrocarbons becomes about 0.3 second or less, the $NO_X$ purification rate R1 falls. Therefore, in the embodiment according to the present invention, the injection period of the hydrocarbons is made from 0.3 second to 5 seconds.

Figure 11A:
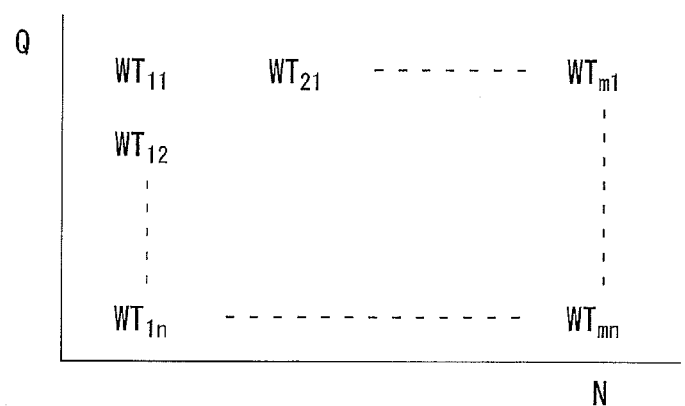
FIGS. 11A and 11B are views which show maps of the injection amount of hydrocarbons etc.
Figure 11B:
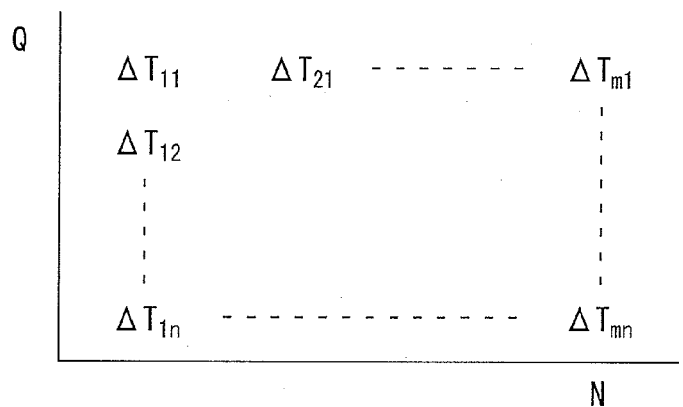

Now, in the embodiment according to the present invention, when the $NO_X$ purification action by the first $NO_X$ purification method is performed, by controlling the injection amount and injection timing of hydrocarbons from the hydrocarbon feed valve 15, the air-fuel ratio (A/F) in of the exhaust gas flowing into the exhaust purification catalyst 13 and the injection period ΔT of the hydrocarbons are controlled so as to become the optimal values for the engine operating state. In this case, in the embodiment according to the present invention, the optimum hydrocarbon injection amount WT when the $NO_X$ purification action by the first $NO_X$ purification method is performed is stored as a function of the injection amount Q from fuel injectors 3 and the engine speed N in the form of a map such as shown in FIG. 11A in advance in the ROM 32. Further, the optimum injection period ΔT of the hydrocarbons at this time is also stored as a function of the injection amount Q from the fuel injectors 3 and the engine speed N in the form of a map such as shown in FIG. 11B in advance in the ROM 32.

Next, referring to FIG. 12 to FIG. 15, an $NO_X$ purification method when making the exhaust purification catalyst 13 function as an $NO_X$ storage catalyst will be explained specifically. The $NO_X$ purification method in the case of making the exhaust purification catalyst 13 function as an $NO_X$ storage catalyst in this way will be referred to below as the "second $NO_X$ purification method".

Figure 12:
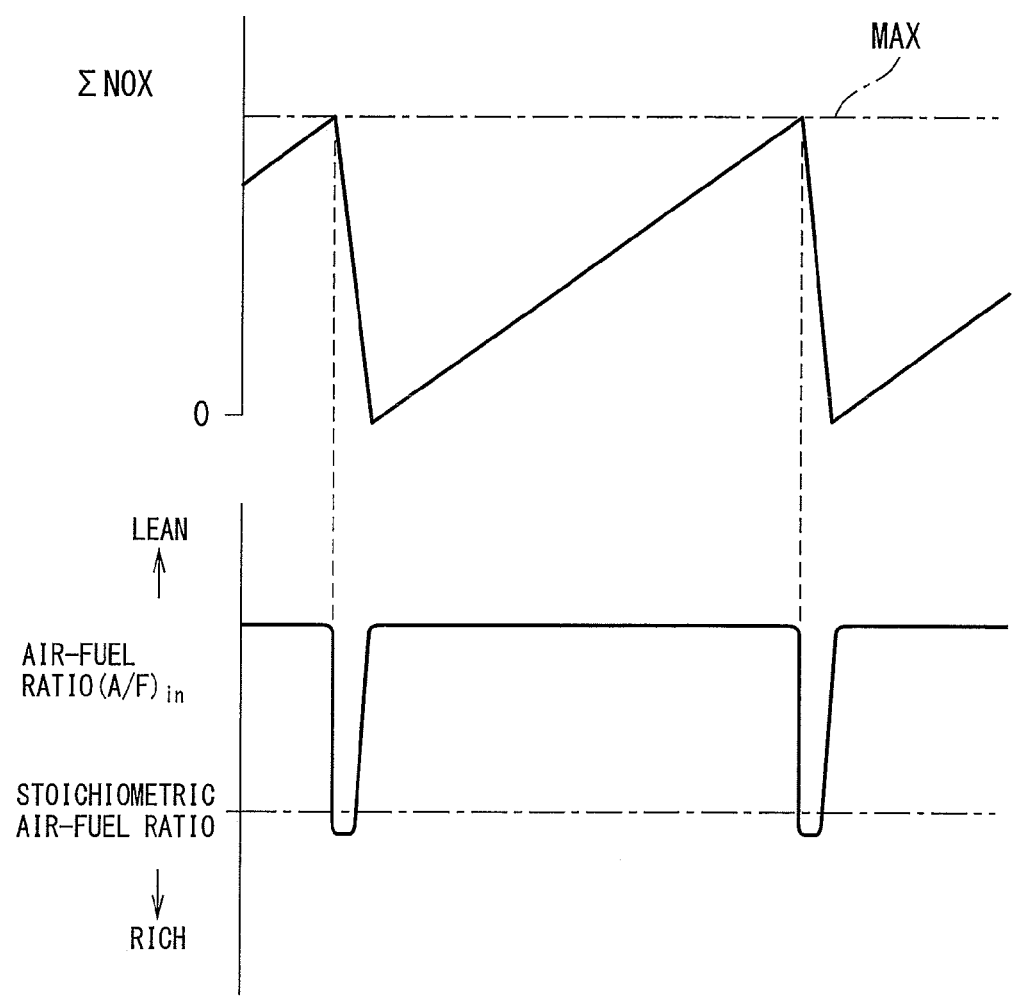
FIG. 12 is a view which shows an $NO_X$ release control.

In this second $NO_X$ purification method, as shown in FIG. 12, when the stored $NO_X$ amount $\Sigma NO_X$ of $NO_X$ which is stored in the basic layer 53 exceeds a first predetermined allowable amount MAX 1, the air-fuel ratio (A/F) in of the exhaust gas flowing into the exhaust purification catalyst 13 is temporarily made rich. If the air-fuel ratio (A/F) in of the exhaust gas is made rich, the $NO_X$ which was stored in the basic layer 53 when the air-fuel ratio (A/F) in of the exhaust gas was lean is released from the basic layer 53 all at once and reduced. Due to this, the $NO_X$ is removed.

Figure 13:
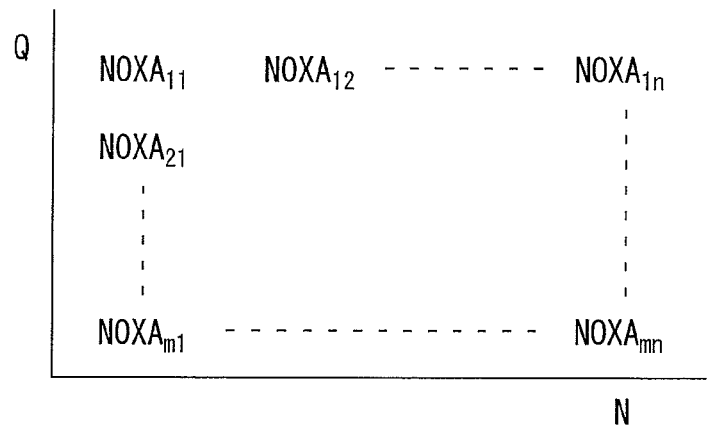
FIG. 13 is a view which shows a map of an exhausted $NO_X$ amount NOXA.

The stored $NO_X$ amount $\Sigma NO_X$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the injection amount Q and engine speed N in the form of a map such as shown in FIG. 13 in advance in the ROM 32. The stored $NO_X$ amount $\Sigma NO_X$ is calculated from this exhausted $NO_X$ amount NOXA. In this case, as explained before, the period at which the air-fuel ratio (A/F) in of the exhaust gas is made rich is usually 1 minute or more.

Figure 14:
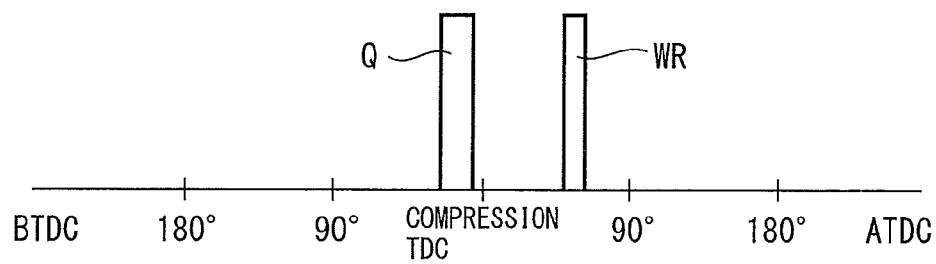
FIG. 14 is a view which shows a fuel injection timing.
Figure 15:
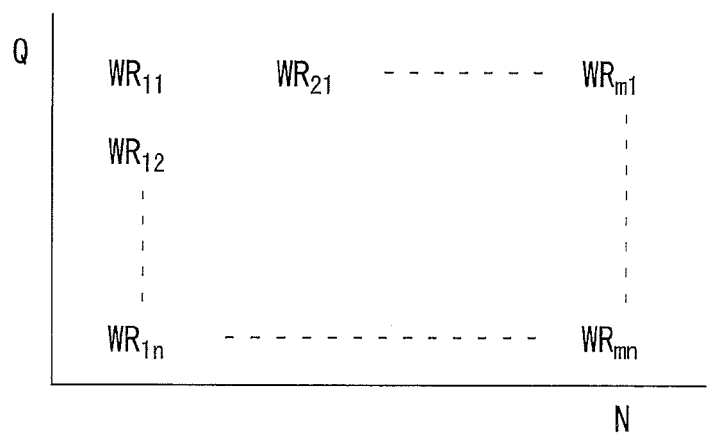
FIG. 15 is a view which shows a map of an additional hydrocarbon feed amount WR.

In this second $NO_X$ purification method, as shown in FIG. 14, by injecting an additional fuel WR into each combustion chamber 2 from the fuel injector 3 in addition to the combustion-use fuel Q, the air-fuel ratio (A/F) in of the exhaust gas which flows into the exhaust purification catalyst 13 is made rich. Note that, in FIG. 14, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 15 in advance in the ROM 32. In this way, in case where the second $NO_X$ purification method is performed, when the air-fuel ratio (A/F) in of the exhaust gas flowing into the exhaust purification catalyst 13 should be made rich, the air-fuel ratio (A/F) in of the exhaust gas discharged from the combustion chamber 2 is made rich by feeding the additional fuel WR to the combustion chamber 2.

Figure 16:
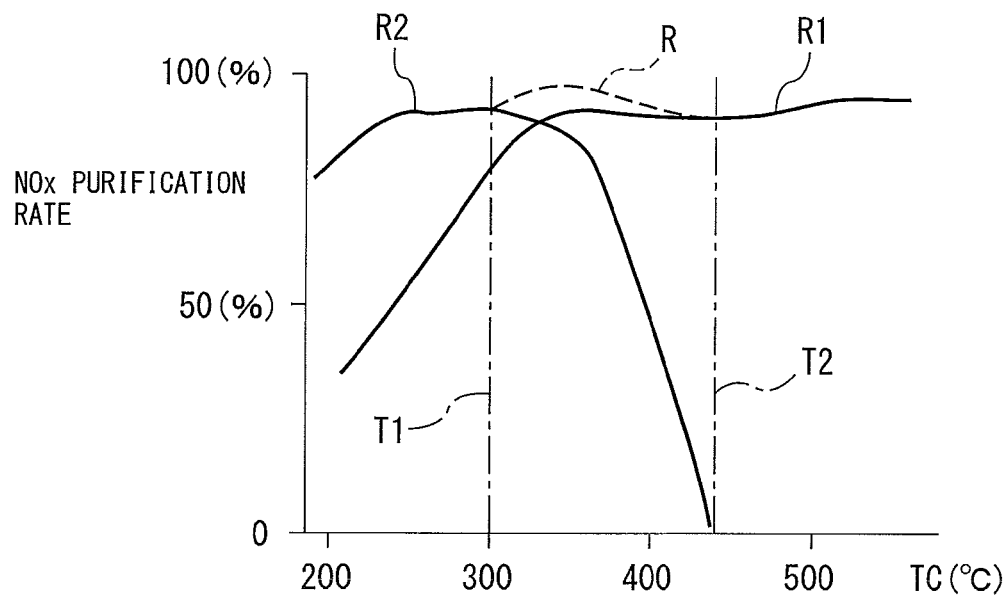
FIG. 16 is a view which shows an $NO_X$ purification rate R1 and an $NO_X$ purification rate R2.

FIG. 16 shows together the $NO_x$ removal rate R1 when the $NO_x$ removal action by the first $NO_x$ removal method is being performed and the $NO_X$ removal rate R2 when the $NO_x$ removal action by the second $NO_x$ removal method is being performed.

As shown in FIG. 16, the $NO_x$ removal rate R1 when the $NO_x$ removal action by the first $NO_x$ removal method is being performed becomes extremely high when the catalyst temperature TC is 350° C. or more and falls along with the fall of the catalyst temperature TC when the catalyst temperature becomes 350° C. or less. On the other hand, the $NO_x$ removal rate R2 when the $NO_x$ removal action by the second $NO_x$ removal method is being performed becomes extremely high when the catalyst temperature TC is 250° C. to 300° C., starts to fall a bit at a time along with the catalyst temperature becoming higher when the catalyst temperature TC becomes 300° C. or more, and rapidly falls along with the rise of the catalyst temperature TC when the catalyst temperature TC becomes 350° C. or more.

In FIG. 16, T1 shows the catalyst temperature when the $NO_x$ removal rate R2 starts to fall when the catalyst temperature TC rises in the case where the $NO_x$ removal action by the second $NO_x$ removal method is being performed, while T2 shows the catalyst temperature when the $NO_x$ removal rate R2 becomes zero when the catalyst temperature TC further rises in the case where the $NO_x$ removal action by the second $NO_x$ removal method is being performed. In this embodiment according to the present invention, the temperature region where the catalyst temperature TC is the temperature T1 or less is called the "low temperature region", the temperature region where the catalyst temperature TC is between the temperature T1 and the temperature T2 is called the "intermediate temperature region", and the temperature region where the catalyst temperature TC is the temperature T2 or more is called the "high temperature region". Therefore, in this embodiment according to the present invention, the intermediate temperature region shows the temperature range where the $NO_x$ removal rate R2 continues to fall if the temperature TC of the exhaust purification catalyst 13 rises in the case where the $NO_x$ removal action by the second $NO_x$ removal method is being performed.

As shown in FIG. 16, in the high temperature region where the catalyst temperature TC is higher than the temperature T2, the $NO_x$ removal rate R2 becomes zero. With the second $NO_x$ removal method, $NO_x$ cannot be removed. Therefore, in this embodiment according to the present invention, at this time, that is, in the high temperature region, the $NO_x$ removal action by the first $NO_x$ removal method is performed. On the other hand, in the low temperature region where the catalyst temperature TC is lower than the temperature T1, the $NO_x$ removal rate R2 becomes high. Therefore, in this embodiment according to the present invention, at this time, that is, in the low temperature region, the $NO_x$ removal action by the second $NO_x$ removal method is performed. As opposed to this, when the catalyst temperature TC is between the temperature T1 and the temperature T2, that is, in the intermediate temperature region, the $NO_x$ removal rate R1 falls in part of the temperature region and the $NO_x$ removal rate R2 falls in a considerably broad temperature region. Therefore, in this case, even if using either of the first and the second $NO_x$ removal methods, the $NO_x$ removal rate will fall in some temperature region.

Figure 17A:
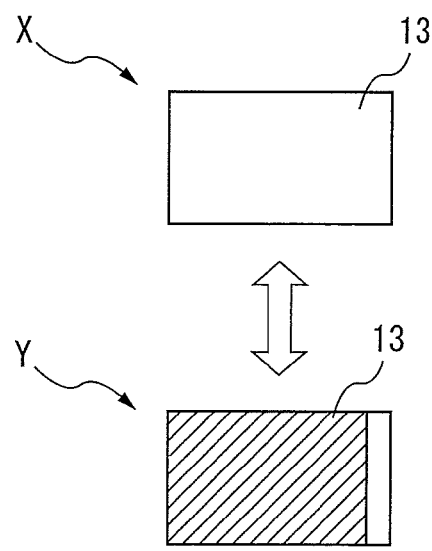
FIGS. 17A and 17B are views for explaining the amount of stored $NO_X$ in an exhaust purification catalyst.
Figure 17B:
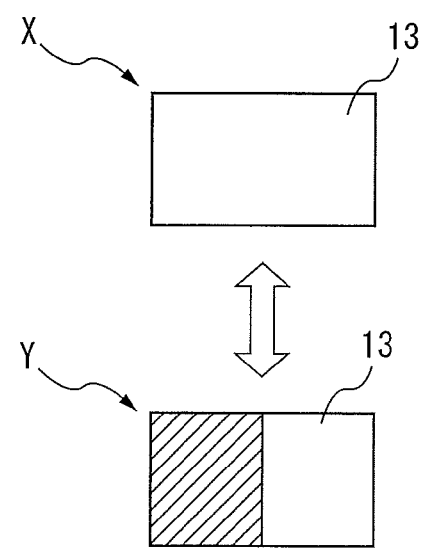

Therefore, in the present invention, when the catalyst temperature TC is in the intermediate temperature region, the first $NO_x$ removal method and the second $NO_x$ removal method are jointly used so as to obtain an $NO_x$ removal rate which is higher than the $NO_x$ removal rate R1 when the $NO_x$ removal action by the first $NO_x$ removal method is performed and the $NO_x$ removal rate R2 when the $NO_x$ removal action by the second $NO_x$ removal method is performed. Next, this will be explained with reference to FIGS. 17A and 17B. Note that, FIGS. 17A and 17B show the exhaust purification catalyst 13. In FIGS. 17A and 17B, X shows when the exhaust purification catalyst 13 is not storing $NO_x$. On the other hand, in FIGS. 17A and 17B, Y shows when the exhaust purification catalyst 13 is storing $NO_x$, and the hatchings in FIGS. 17A and 17B show the ratio of the $NO_x$ which is actually stored with respect to the total amount of $NO_x$ which the exhaust purification catalyst 13 can store, that is, the $NO_x$ storage ratio.

FIG. 17A shows when the $NO_x$ removal action by the second $NO_x$ removal method is being performed. At this time, the state which is shown by X and the state which is shown by Y are repeated. That is, at this time, as shown in FIG. 17A by Y, if the $NO_x$ amount which is stored in the exhaust purification catalyst 13 approaches saturation, that is, exceeds the first allowable value MAX which is shown in FIG. 12, the air-fuel ratio of the exhaust gas which flows into the exhaust purification catalyst 13 is made rich. Due to this, as shown in FIG. 17A by X, the $NO_x$ storage ratio in the exhaust purification catalyst 13 is made zero. Next, again, the amount of $NO_x$ stored in the exhaust purification catalyst 13 increases.

As opposed to this, FIG. 17B shows the case where the first $NO_x$ removal method and the second $NO_x$ removal method are jointly used in the intermediate temperature region. In this case, in FIG. 17B, the state which is shown by X and the state which is shown by Y are repeated. That is, at this time, as shown in FIG. 17B by Y, if the $NO_x$ amount which is stored in the exhaust purification catalyst 13 becomes the second allowable value SX which is smaller than the first allowable value MAX, that is, in the example which is shown in FIG. 17B, if the $NO_x$ storage ratio becomes 50 percent, the air-fuel ratio of the exhaust gas which flows into the exhaust purification catalyst 13 is made rich. Due to this, as shown in FIG. 17B by X, the $NO_x$ storage ratio in the exhaust purification catalyst 13 is made zero. Next, again, the amount of $NO_x$ which is stored in the exhaust purification catalyst 13 increases. In this way, in the example which is shown in FIG. 17B, this second allowable value SX is made the stored $NO_x$ amount when the $NO_x$ storage ratio is 50 percent.

That is, if the exhaust purification catalyst 13 stores $NO_x$ when the $NO_x$ removal action by the first $NO_x$ removal method is being performed, $NO_x$ becomes harder to stick to or be adsorbed in the form of a reducing intermediate at the surface part of the basicity layer 53 where the $NO_x$ is stored. Therefore, if the amount of $NO_x$ which is stored at the exhaust purification catalyst 13 increases, the amount of $NO_x$ which can be removed by the $NO_x$ removal action by the first $NO_x$ removal method decreases. Therefore, to remove $NO_x$ well by using the $NO_x$ removal action by the first $NO_x$ removal method even if the exhaust purification catalyst 13 stores $NO_x$, it is necessary to prevent the exhaust purification catalyst 13 from storing a large amount of $NO_x$. In this case, compared with the maximum stored $NO_x$ amount when the $NO_x$ removal action by the second $NO_x$ removal method is being performed, which is shown in FIG. 17A by Y, if limiting the maximum stored $NO_x$ amount when the $NO_x$ removal action by the first $NO_x$ removal method is being performed to a small amount such as shown in FIG. 17B by Y, it is possible to sufficiently secure an area of the surface part of the basicity layer 53 at which the reducing intermediate can easily stick or be adsorbed and, therefore, when the $NO_x$ removal action by the first $NO_x$ removal method is performed, a good $NO_x$ removal action is performed.

Therefore, in the example which is shown in FIG. 17B, in the intermediate temperature region, to limit the maximum stored $NO_x$ amount to a small amount such as shown in FIG. 17B by Y, when the stored $NO_x$ amount in the exhaust purification catalyst 13 becomes the second allowable value SX which is smaller than the first allowable value MAX, the air-fuel ratio of the exhaust gas which flows into the exhaust purification catalyst 13 is made rich. That is, in the intermediate temperature region, the $NO_x$ removal action by the first $NO_x$ removal method is performed, and when the stored $NO_x$ amount in the exhaust purification catalyst 13 becomes the second allowable value SX, the air-fuel ratio of the exhaust gas which flows into the exhaust purification catalyst 13 is made rich. By doing this, if jointly using the first $NO_x$ removal method and the second $NO_x$ removal method, the $NO_x$ removal action by the second $NO_x$ removal method is superposed in form over the $NO_x$ removal action by the first $NO_x$ removal method, so a high $NO_x$ removal rate such as shown in FIG. 16 by R is obtained.

Therefore, in the present invention, there is provided an exhaust purification system of an internal combustion engine in which an exhaust purification catalyst 13 is arranged in an engine exhaust passage and a hydrocarbon feed valve 15 is arranged in the engine exhaust passage upstream of the exhaust purification catalyst 13, a precious metal catalyst 51 is carried on an exhaust gas flow surface of the exhaust purification catalyst 13 and a basic exhaust gas flow surface part 54 is formed around the precious metal catalyst 51, the exhaust purification catalyst 13 has the property of reducing the $NO_x$ which is contained in exhaust gas if making a concentration of hydrocarbons which flow into the exhaust purification catalyst 13 vibrate by within a predetermined range of amplitude and by within a predetermined range of period and has the property of being increased in storage amount of $NO_x$ which is contained in the exhaust gas if making the vibration period of the hydrocarbon concentration longer than the predetermined range, a first $NO_x$ removal method which injects hydrocarbons from the hydrocarbon feed valve 15 by a predetermined injection period to thereby remove the $NO_x$ which is contained in the exhaust gas and a second $NO_x$ removal method which makes the air-fuel ratio of the exhaust gas which flows into the exhaust purification catalyst 13 rich to make the exhaust purification catalyst 13 release the stored $NO_x$ when the $NO_x$ which is stored in the exhaust purification catalyst 13 exceeds a predetermined first allowable value MAX are selectively used, and in the second $NO_x$ removal method, the period by which the air-fuel ratio of the exhaust gas which flows into the exhaust purification catalyst 13 is made rich is longer than the above-mentioned predetermined injection period, in which exhaust purification system of an internal combustion engine, temperature regions which the exhaust purification catalyst can take at the time of engine operation are divided into the three regions of a low temperature region, an intermediate temperature region, and a high temperature region, in the high temperature region, an $NO_x$ removal action by the first $NO_x$ removal method is performed, in the low temperature region, an $NO_x$ removal action by the second $NO_x$ removal method is performed, and in the intermediate temperature region, hydrocarbons are injected from the hydrocarbon feed valve 15 by the predetermined injection period and, when the $NO_x$ which is stored in the exhaust purification catalyst 13 exceeds a predetermined second allowable value SX of a value smaller than the first allowable value MAX, the air-fuel ratio of the exhaust gas which flows into the exhaust purification catalyst 13 is made rich.

Figure 18:
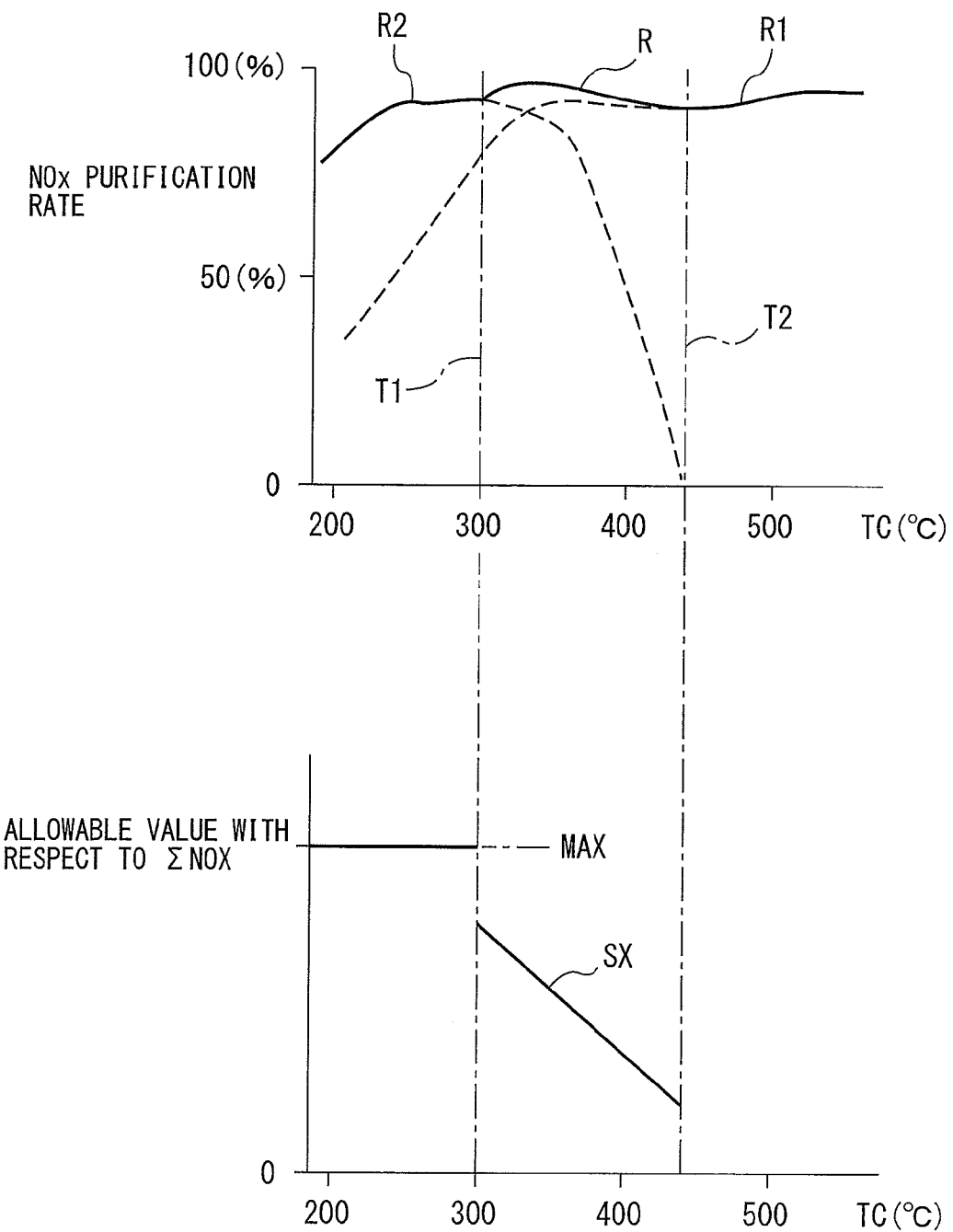
FIG. 18 is a view which shows allowable values MAX and SX.
Figure 19:
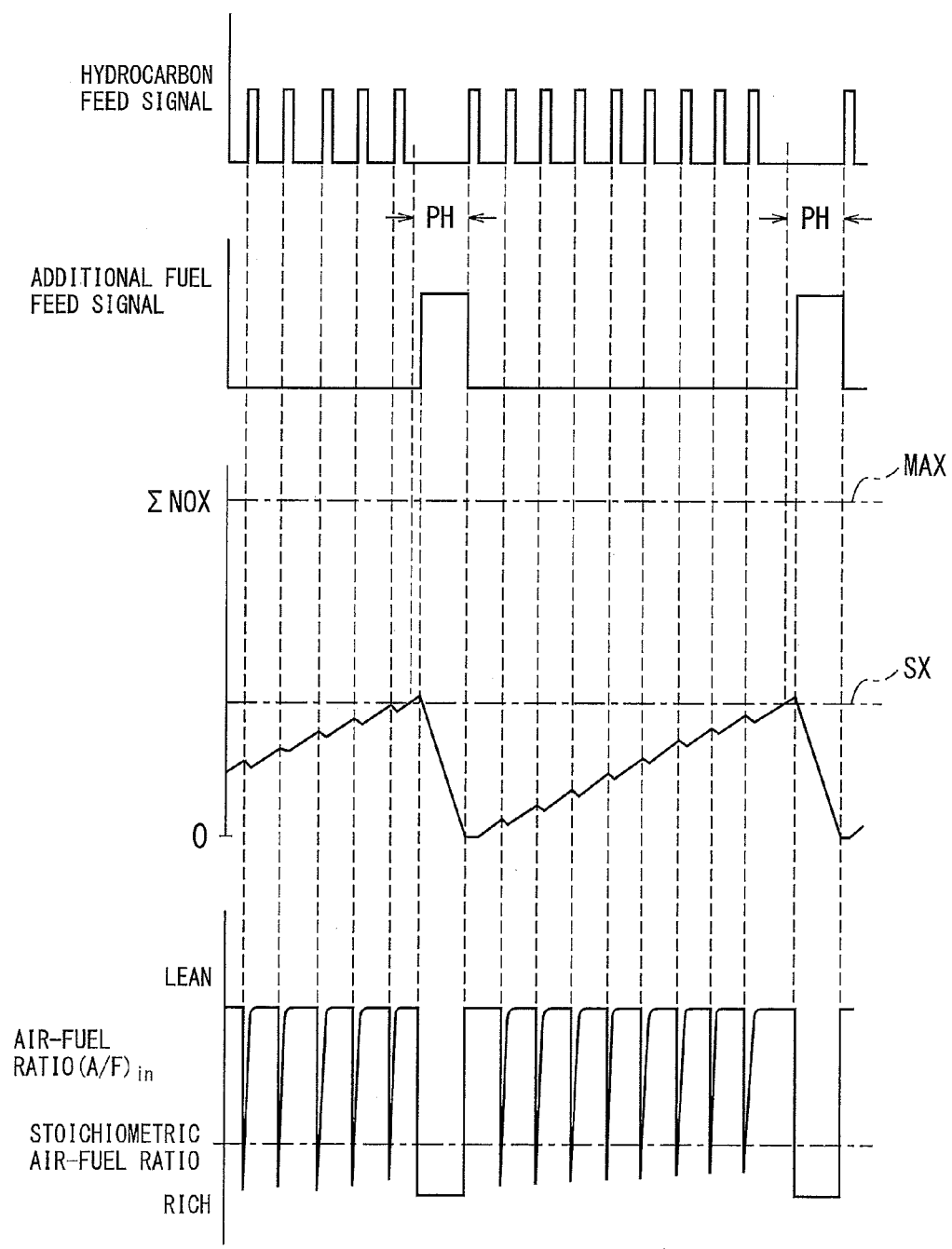
FIG. 19 is a time chart which shows an $NO_X$ purification control in the middle temperature region.

FIG. 18 shows an embodiment in which the second allowable value SX is changed in accordance with the temperature TC of the exhaust purification catalyst 13. Note that, FIG. 18 also shows the changes in the $NO_x$ removal rates R1, R2, and R. Now then, in the intermediate temperature region, if the catalyst temperature TC becomes higher, the amount of $NO_x$ which can be stored in the exhaust purification catalyst 13 becomes smaller. When the amount of $NO_x$ which can be stored in the exhaust purification catalyst 13 becomes smaller, unless the exhaust purification catalyst 13 is made to release $NO_x$ while the amount of $NO_x$ which is stored in the exhaust purification catalyst 13 is small, $NO_x$ can no longer be stored. Therefore, when the amount of $NO_x$ which can be stored in the exhaust purification catalyst 13 becomes small, it is necessary to make the air-fuel ratio of the exhaust gas which flows into the exhaust purification catalyst 13 rich while the amount of storage of $NO_x$ is small. Therefore, in the embodiment which is shown in FIG. 19, the second allowable value SX is made smaller as the temperature TC of the exhaust purification catalyst 13 becomes higher. If the amount of $NO_x$ which can be stored in the exhaust purification catalyst 13 becomes smaller, the amount of $NO_x$ which can be removed by the $NO_x$ removal action by the second $NO_x$ removal method is decreased and the amount of $NO_x$ which is removed by the $NO_x$ removal action by the first $NO_x$ removal method is increased. That is, in the embodiment which is shown in FIG. 19, in the intermediate temperature region, as the temperature TC of the exhaust purification catalyst 13 becomes higher, the amount of $NO_x$ which is removed by the $NO_x$ removal action by the second $NO_x$ removal method is decreased and the amount of $NO_x$ which is removed by the $NO_x$ removal action by the first $NO_x$ removal method is increased.

FIG. 19 shows a time chart of $NO_x$ purification control in the intermediate temperature region. Note that, FIG. 19 shows the hydrocarbon feed signal from the hydrocarbon feed valve 15, the feed signal of the additional fuel WR from the fuel injector 3, the change in the $NO_x$ amount $\Sigma NOX$ which is stored in the exhaust purification catalyst 13, and the change in the air-fuel ratio (A/F) in of the exhaust gas which flows into the exhaust purification catalyst 13. Further, FIG. 18 shows the first allowable value MAX and the second allowable value SX. From FIG. 18, it will be understood that the second allowable value SX is considerably smaller compared with the first allowable value MAX.

As will be understood from FIG. 19, when the stored $NO_x$ amount $\Sigma NOX$ is smaller than the second allowable value SX, hydrocarbons are injected in accordance with the hydrocarbon feed signal from the hydrocarbon feed valve 15 by a predetermined injection period and the $NO_x$ removal action by the first $NO_x$ removal method is performed. As opposed to this, when the stored $NO_x$ amount $\Sigma NOX$ exceeds the second allowable value SX, additional fuel WR is injected from the fuel injector 3 over a certain time period in accordance with the additional fuel feed signal and thereby the air-fuel ratio (A/F) in of the exhaust gas which flows into the exhaust purification catalyst 13 is made rich. When the additional fuel WR finishes being injected, the stored $NO_x$ finishes being released, so the stored $NO_x$ amount $\Sigma NOX$ becomes zero. Note that, when additional fuel WR is injected from the fuel injector 3 and the air-fuel ratio (A/F) in of the exhaust gas which flows into the exhaust purification catalyst 13 becomes rich, if hydrocarbons are injected from the hydrocarbon feed valve 15, the air-fuel ratio (A/F) in of the exhaust gas which flows into the exhaust purification catalyst 13 will become too rich, the hydrocarbons will slip through the exhaust purification catalyst 13, and there is the danger of white smoke being generated. Therefore, as shown in FIG. 18 by PH, in the intermediate temperature region, while the feed of additional fuel WR from the fuel injector 3 is being used to make the air-fuel ratio of the exhaust gas which flows into the exhaust purification catalyst 13 rich, injection of hydrocarbons from the hydrocarbon feed valve 15 is suspended.

On the other hand, in this embodiment according to the present invention, when the $NO_x$ removal action by the first $NO_x$ removal method is being performed, the $NO_x$ amount NOX which is stored per unit time in the exhaust purification catalyst 13 is calculated based on the following formula:

$$NOX = (NOXA - RR) \cdot KR$$

Figure 20A:
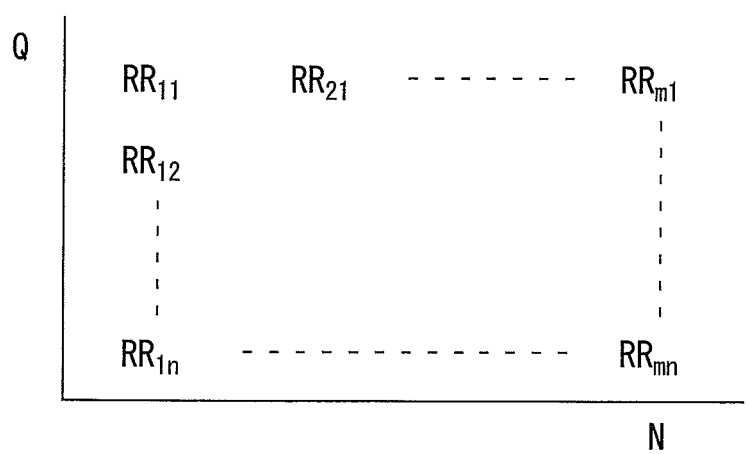
FIGS. 20A and 20B are views which show a map of the $NO_X$ reducing rate RR etc.
Figure 20B:
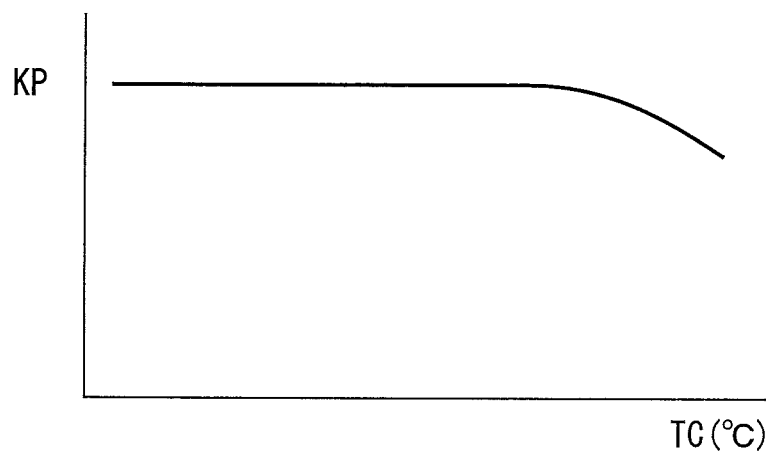

Here, NOXA shows the amount of $NO_x$ which is exhausted per unit time from the engine which is shown in FIG. 13, RR shows the amount of reduction of $NO_x$ per unit time by hydrocarbons which are injected from the hydrocarbon feed valve 15, and KR shows the storage rate of $NO_x$ in the exhaust purification catalyst 13. As shown in FIGS. 11A and 11B, the injection amount WT and injection period $\Delta T$ of hydrocarbons from the hydrocarbon feed valve 15 are determined in advance in accordance with the operating state of the engine. Therefore, the $NO_x$ reduction amount RR which is reduced per unit time of injection by the hydrocarbons which are injected from the hydrocarbon feed valve 15 is also determined in advance in accordance with the operating state of the engine. Therefore, in this embodiment according to the present invention, this $NO_x$ reduction amount per unit time is stored as a function of the amount of injection Q from the fuel injector 3 and the engine speed N in the form of a map such as shown in FIG. 20A in advance in the ROM 32. On the other hand, the $NO_x$ storage rate KR shows the ratio of the amount of $NO_x$ which is stored in the exhaust purification catalyst 13 in the amount of $NO_x$ (NOXA-RR) which could not be reduced by the hydrocarbons injected from the hydrocarbon feed valve 15. This $NO_x$ storage rate KP, as shown in FIG. 20B, falls as the temperature TC of the exhaust purification catalyst 13 becomes higher.

If the $NO_x$ amount NOX which is stored in the exhaust purification catalyst 13 per unit time is calculated, the $NO_x$ amount $\Sigma NOX$ which is stored in the exhaust purification catalyst 13 is calculated by cumulatively adding this $NO_x$ amount NOX. In this way, in this embodiment according to the present invention, in the intermediate temperature region, when the $NO_x$ removal action by the first $NO_x$ removal method is being performed, the $NO_x$ amount $\Sigma NOX$ which is stored in the exhaust purification catalyst 13 is calculated from the $NO_x$ amount NOXA which is exhausted from the engine, the $NO_x$ reduction amount RR which is determined from the operating state of the engine, and the $NO_x$ storage rate KP which is determined from the temperature TC of the exhaust purification catalyst 13 and, when the calculated $NO_x$ amount $\Sigma NOX$ exceeds the second allowable value SX, the air-fuel ratio of the exhaust gas which flows into the exhaust purification catalyst 13 is made rich.

Figure 22:
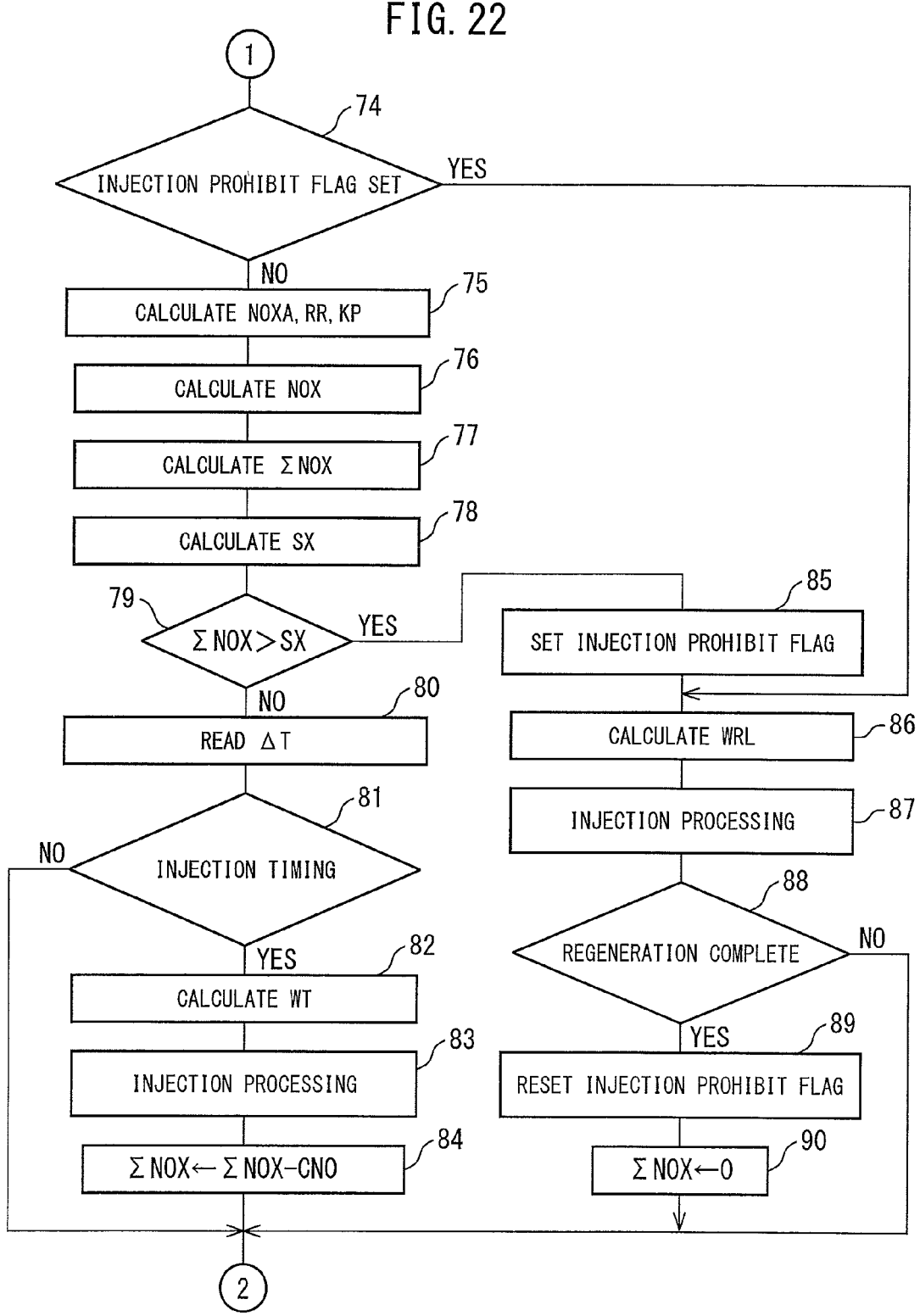
FIG. 22 is a flow chart for performing an $NO_X$ purification control.

FIG. 21 and FIG. 22 show the $NO_x$ purification control routine for performing the $NO_x$ removal method which is shown in FIG. 19. This routine is executed by interruption every certain time period.

Referring to FIG. 21, first, to start, at step 60, the detected value of the temperature sensor 23 is used as the basis to calculate the temperature TC of the exhaust purification catalyst 13. Next, at step 61, it is judged if the catalyst temperature TC is lower than the temperature T1. When the catalyst temperature TC is lower than the temperature T1, that is, when in the low temperature region, it is judged that the $NO_x$ removal action by the second $NO_x$ removal method should be performed. The routine proceeds to step 62 where the $NO_x$ removal action by the second $NO_x$ removal method is performed.

That is, at step 62, the $NO_x$ amount NOXA which is exhausted per unit time is calculated from the map which is shown in FIG. 13. Next at step 63, the exhausted $NO_x$ amount NOXA is added to $\Sigma NOX$ to calculate the stored $NO_x$ amount $\Sigma NOX$. Next, at step 64, it is judged if the stored $NO_x$ amount $\Sigma NOX$ exceeds the first allowable value MAX. When $\Sigma NOX > MAX$, the routine proceeds to step 65 where the amount of additional fuel WR is calculated from the map which is shown in FIG. 15. Next, at step 66, the action of injection of additional fuel is performed. At this time, the air-fuel ratio (A/F) in of the exhaust gas which flows into the exhaust purification catalyst 13 is made rich. Next, at step 67, it is judged if the exhaust purification catalyst 13 has finished being regenerated. When it is judged that the exhaust purification catalyst 13 has finished being regenerated, the routine proceeds to step 68 where $\Sigma NOX$ is cleared.

On the other hand, at step 61, when it is judged that the exhaust temperature TC is higher than the temperature T1, the routine proceeds to step 69 where it is judged if the catalyst temperature TC is higher than the temperature T2. When the catalyst temperature T is higher than the temperature T2, that is, when in the high temperature region, it is judged that the $NO_x$ removal action by the first $NO_x$ removal method should be performed and the routine proceeds to step 70 where the $NO_x$ removal action by the first $NO_x$ removal method is performed. That is, at step 70, the injection period $\Delta T$ of hydrocarbons is read from FIG. 11B. Next, at step 71, it is judged if the injection timing has been reached. When the injection timing has been reached, the routine proceeds to step 72 where the amount of injection WT of hydrocarbons is calculated from FIG. 11A. Next, at step 73, the injection amount WT which is calculated at step 72 is used to inject hydrocarbons from the hydrocarbon feed valve 15.

On the other hand, when it is judged at step 69 that the catalyst temperature TC is lower than the temperature T2, that is, when it is the intermediate temperature region, the routine proceeds to step 74 of FIG. 22 where it is judged if the injection prohibit flag which shows that injection of hydrocarbons from the hydrocarbon feed valve 15 should be prohibited has been set. When the injection prohibit flag is not set, the routine proceeds to step 75 where the $NO_x$ amount NOXA which is exhausted per unit time is calculated from the map which is shown in FIG. 13, the $NO_x$ reduction amount RR is calculated from the map which is shown in FIG. 20A, and the $NO_x$ storage rate KP is calculated from FIG. 20B. Next, at step 76, the $NO_x$ amount NOX which is stored per unit time is calculated based on the following formula:

$$NOX=(NOXA-RR) \cdot KR$$

Next at step 77, the $NO_x$ amount $\Sigma NOX$ which is stored in the exhaust purification catalyst 13 is calculated based on the following formula:

$$\Sigma NOX = \Sigma NOX + NOX$$

Next, at step 78, the second allowable value SX which is shown in FIG. 18 is calculated. Next, at step 79, it is judged if the stored $NO_x$ amount $\Sigma NOX$ exceeds the second allowable value SX. When the stored $NO_x$ amount $\Sigma NOX$ does not exceed the second allowable value SX, the routine proceeds to step 80 where the $NO_x$ removal action by the first $NO_x$ removal method is performed. That is, at step 80, the injection period $\Delta T$ of the hydrocarbons is read from FIG. 11B. Next, at step 81, it is judged if the injection timing has been reached. When the injection timing has been reached, the routine proceeds to step 82 where the injection amount WT of hydrocarbons is calculated from FIG. 11A. Next, at step 83, the injection amount WT which is calculated at step 82 is used to injection hydrocarbons from the hydrocarbon feed valve 15. Next, at step 84, the $NO_x$ amount CNO which is released from the exhaust purification catalyst 13 at the time of injection of hydrocarbons from the hydrocarbon feed valve 15, is subtracted from the stored $NO_x$ amount $\Sigma NOX$.

On the other hand, when it is judged at step 79 that the stored $NO_x$ amount $\Sigma NOX$ exceeds the second allowable value SX, the routine proceeds to step 85 where the injection prohibit flag is set, next the routine proceeds to step 86. If the injection prohibit flag is set, at the next processing cycle, the routine jumps from step 74 to step 86. At step 86, the amount of additional fuel WRL which is required for making the stored $NO_x$ be released is calculated. Next, at step 87, the action of injection of additional fuel to the inside of the combustion chamber 2 is performed. At this time, the air-fuel ratio (A/F) in of the exhaust gas which flows into the exhaust purification catalyst 13 is made rich. Next, at step 88, it is judged if the exhaust purification catalyst 13 has finished being regenerated. When it is judged that the exhaust purification catalyst 13 has finished being regenerated, the routine proceeds to step 89 where the injection prohibit flag is reset. Next at step 90, $\Sigma NOX$ is cleared.

Figure 23:
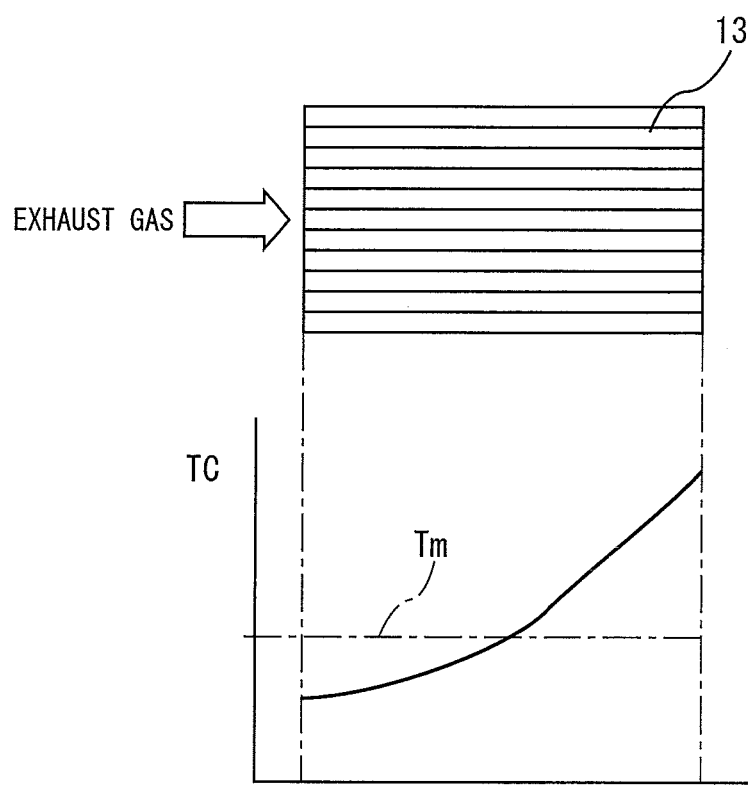
FIG. 23 is a view for explaining the temperature distribution in an exhaust purification catalyst.

In this regard, when the catalyst temperature TC is maintained at the intermediate temperature region, a large temperature difference does not arise between the upstream side and the downstream side of the exhaust purification catalyst 13. On the other hand, for example, if the amount of injection of hydrocarbons from the hydrocarbon feed valve 15 for regeneration of the particulate filter is increased, the temperature TC of the exhaust purification catalyst 13 becomes higher and the catalyst temperature TC shifts from the intermediate temperature region to the high temperature region. Next, if the particulate filter finishes being regenerated, the catalyst temperature TC falls and the catalyst temperature TC again becomes the intermediate temperature region. In this regard, when the particulate filter finishes being regenerated and the catalyst temperature TC falls, the exhaust purification catalyst 13 is cooled from the upstream side. Therefore, at this time, as shown in FIG. 23, the downstream side becomes higher than the upstream side. That is, when the particulate filter finishes being regenerated, a large temperature difference arises between the upstream side and the downstream side of the exhaust purification catalyst 13. At this time, the catalyst temperature TC which is calculated from the detected value of the temperature sensor 23 becomes the mean temperature such as shown by Tm in FIG. 23.

On the other hand, as explained above, in the intermediate temperature region, the $NO_x$ amount NOX which is stored per unit time is calculated based on the following formula:

$$NOX=(NOXA-RR) \cdot KR$$

The $NO_x$ reduction amount RR in this case is made the amount at the mean temperature in the intermediate temperature region. In this regard, this $NO_x$ reduction amount RR increases the higher the catalyst temperature TC becomes. Therefore, as shown in FIG. 23, when there is a part in the exhaust purification catalyst 13 where the temperature TC is high, the $NO_x$ reduction amount RR increases. Therefore, in this embodiment, the $NO_x$ amount NOX which is stored per unit time is calculated based on the following formula, and when in an operating state where there is a part in the exhaust purification catalyst 13 where the temperature is high as shown in FIG. 23, the value of the increase coefficient ZK, which is usually made 1.0, is increased.

$$NOX=(NOXA-RR \cdot ZK) \cdot KR$$

When, in this way, in this embodiment, a temperature difference arises in the exhaust purification catalyst 13 and there is a temperature region which is higher than the temperature TC of the exhaust purification catalyst 13 which is detected in the exhaust purification catalyst 13, the $NO_x$ reduction amount RR increases.

Note that, as another embodiment, it is also possible to arrange an oxidation catalyst for reforming the hydrocarbons in the engine exhaust passage upstream in the exhaust purification catalyst 13.

REFERENCE SIGNS LIST 4 intake manifold
5 exhaust manifold
7 exhaust turbocharger
12 exhaust pipe
13 exhaust purification catalyst
14 particulate filter
15 hydrocarbon feed valve

The invention claimed is:
1. An exhaust purification system of an internal combustion engine comprising:
a hydrocarbon feed valve arranged in an engine exhaust passage;
an exhaust purification catalyst arranged in the engine exhaust passage, the hydrocarbon feed valve being disposed upstream of the exhaust purification catalyst, the exhaust purification catalyst including: (i) a precious metal catalyst formed on an exhaust gas flow surface of the exhaust purification catalyst, and (ii) a basic exhaust gas flow surface part formed around the precious metal catalyst, the exhaust purification catalyst being configured to: (1) reduce $NO_x$ contained in exhaust gas flowing through the engine exhaust passage based on a concentration of hydrocarbons flowing into the exhaust purification catalyst oscillating within a predetermined range of amplitude and a predetermined oscillation period, and (2) increase a storage amount of $NO_x$ contained in the exhaust gas by oscillating the concentration of hydrocarbons for a period longer than the predetermined oscillation period; and an electronic control unit configured to control the hydrocarbon feed valve to supply hydrocarbons to the exhaust purification catalyst, the electronic control unit performing:
- a first $NO_x$ removal method by injecting hydrocarbons into the exhaust purification catalyst from the hydrocarbon feed valve for a predetermined injection period in order to remove the $NO_x$ contained in the exhaust gas and store the removed $NO_x$ from the exhaust purification catalyst; and
- a second $NO_x$ removal method by changing an air-fuel ratio of the exhaust gas which flows into the exhaust purification catalyst to be a rich mixture for a predetermined air-fuel ratio period in order to make the exhaust purification catalyst release a stored $NO_x$ stored in the exhaust purification catalyst, the stored $NO_x$ being released when the stored $NO_x$ exceeds a first allowable value, the predetermined air-fuel ratio period by which the air-fuel ratio of the exhaust gas is made rich is longer than the predetermined injection period, wherein:

the exhaust purification catalyst, at the time of engine operation, is divided into three temperature regions, the three temperature regions are a low temperature region, an intermediate temperature region, and a high temperature region;

in the high temperature region, the electronic control unit performs the first $NO_x$ removal method;

in the low temperature region, the electronic control unit performs the second $NO_x$ removal method; and in the intermediate temperature region, the hydrocarbon feed valve injects hydrocarbons for the predetermined injection period and, when the $NO_x$ that is stored in the exhaust purification catalyst exceeds a predetermined second allowable value, which is a value smaller than the first allowable value, the air-fuel ratio of the exhaust gas is made rich.

2. The exhaust purification system of an internal combustion engine as claimed in claim 1, wherein when the electronic control unit performs the second $NO_x$ removal method and the air-fuel ratio of the exhaust gas flowing into the exhaust purification catalyst is made rich, additional fuel is fed into a combustion chamber so that the air-fuel ratio of the exhaust gas which is exhausted from the combustion chamber is made rich.

3. The exhaust purification system of an internal combustion engine as claimed in claim 1, wherein the intermediate temperature region is a range where, when the second $NO_x$ removal method is being performed, an $NO_x$ removal rate continues to decrease when a temperature of the exhaust purification catalyst increases.

4. The exhaust purification system of an internal combustion engine as claimed in claim 1, wherein the second allowable value decreases as the temperature of the exhaust purification catalyst increases.

5. The exhaust purification system of an internal combustion engine as claimed in claim 1, wherein in the intermediate temperature region, injection of hydrocarbons from the hydrocarbon feed valve is suspended while the air-fuel ratio of the exhaust gas which flows into the exhaust purification catalyst is made rich.

6. The exhaust purification system of an internal combustion engine as claimed in claim 1, wherein in the intermediate temperature region, when the electronic control unit performs the first $NO_x$ removal method:
- an amount of $NO_x$ that is stored in the exhaust purification catalyst is calculated from an amount of $NO_x$ that is exhausted from the engine;
- an amount of reduction of $NO_x$ is determined from an operating state of the engine;
- a $NO_x$ storage rate determined from temperature of the exhaust purification catalyst; and
- when the calculated amount of $NO_x$ exceeds the second allowable value, the air-fuel ratio of the exhaust gas that flows into the exhaust purification catalyst is made rich.

7. The exhaust purification system of an internal combustion engine as claimed in claim 6, wherein a temperature difference exists in the exhaust purification catalyst, and when one of the temperature regions is higher than a detected temperature of the exhaust purification catalyst, the amount of removed $NO_x$ is increased.

* * * * *